(12) United States Patent
Banzhaf

(10) Patent No.: US 11,181,206 B2
(45) Date of Patent: Nov. 23, 2021

(54) VALVE MODULE WITH WIRELESS ENERGY-TRANSFER UNIT

(71) Applicant: Buerkert Werke GmbH & Co. KG, Ingelfingen (DE)

(72) Inventor: Sebastian Banzhaf, Ingelfingen (DE)

(73) Assignee: BUERKERT WERKE GMBH & CO. KG, Ingelfingen (DE)

( * ) Notice: Subject to any disclaimer, the term of this patent is extended or adjusted under 35 U.S.C. 154(b) by 139 days.

(21) Appl. No.: 16/225,123

(22) Filed: Dec. 19, 2018

(65) Prior Publication Data

US 2019/0195389 A1 Jun. 27, 2019

(30) Foreign Application Priority Data

Dec. 22, 2017 (DE) .................. 10 2017 131 101.7

(51) Int. Cl.
*F16K 37/00* (2006.01)
*F16K 31/122* (2006.01)
*F16K 7/12* (2006.01)

(52) U.S. Cl.
CPC .......... *F16K 37/0041* (2013.01); *F16K 7/126* (2013.01); *F16K 31/1221* (2013.01); *F16K 37/0083* (2013.01)

(58) Field of Classification Search
CPC ............. F16K 37/0041; F16K 37/0083; F16K 31/1221; F16K 7/126; F16K 37/0033
USPC ..... 251/129.04, 129.15–129.22, 65; 137/554
See application file for complete search history.

(56) References Cited

U.S. PATENT DOCUMENTS

| | | | | |
|---|---|---|---|---|
| 3,817,488 A | * | 6/1974 | Mack | F16K 31/06 251/30.03 |
| 4,406,303 A | * | 9/1983 | Kilmoyer | F16K 37/0008 137/552 |
| 4,915,347 A | * | 4/1990 | Iqbal | E03C 1/057 137/605 |
| 4,948,090 A | * | 8/1990 | Chen | E03C 1/05 251/129.04 |
| 5,329,956 A | * | 7/1994 | Marriott | F16K 17/04 137/15.01 |
| 5,747,894 A | | 5/1998 | Hirai et al. | |
| 6,039,014 A | * | 3/2000 | Hoppie | F01L 9/04 123/90.11 |
| 6,040,986 A | * | 3/2000 | Sakamoto | H01F 38/14 363/21.02 |
| 6,301,128 B1 | * | 10/2001 | Jang | B60L 53/122 363/17 |
| 7,210,495 B1 | * | 5/2007 | Olson | F17D 5/06 137/357 |

(Continued)

FOREIGN PATENT DOCUMENTS

| | | |
|---|---|---|
| DE | 69507288 T2 | 5/1999 |
| DE | 10049958 A1 | 4/2002 |

(Continued)

*Primary Examiner* — John Bastianelli
(74) *Attorney, Agent, or Firm* — Dilworth IP, LLC

(57) ABSTRACT

A valve module with a wireless energy-transfer unit. The wireless energy-transfer unit has at least one energy-transmitting unit and at least one energy-receiving unit. The energy-receiving unit is arranged on a valve piston, on a valve spindle, on a valve actuator housing, on a valve housing, or on a valve-closing element. The energy-receiving unit may be connected to a sensor unit located inside the valve actuator housing.

19 Claims, 5 Drawing Sheets

(56) References Cited

U.S. PATENT DOCUMENTS

| | | | |
|---|---|---|---|
| 7,212,414 B2* | 5/2007 | Baarman | A61L 2/10 |
| | | | 363/16 |
| 8,413,678 B2 | 4/2013 | Teichmann et al. | |
| 8,424,568 B2* | 4/2013 | Lang | E03C 1/055 |
| | | | 137/605 |
| 2003/0213520 A1 | 11/2003 | Prinz et al. | |
| 2004/0011194 A1 | 1/2004 | Lederer et al. | |
| 2004/0145342 A1* | 7/2004 | Lyon | H02J 50/90 |
| | | | 320/108 |
| 2005/0126639 A1* | 6/2005 | Ens | F16K 37/0083 |
| | | | 137/554 |
| 2008/0115844 A1 | 5/2008 | Teichmann et al. | |
| 2008/0245422 A1* | 10/2008 | McTargett | E03C 1/055 |
| | | | 137/487.5 |
| 2010/0288949 A1* | 11/2010 | Yoo | F16K 99/0001 |
| | | | 251/65 |
| 2010/0294373 A1* | 11/2010 | Haller | F16K 37/0041 |
| | | | 137/1 |
| 2011/0004186 A1* | 1/2011 | Butterfield | G16H 10/40 |
| | | | 604/500 |
| 2011/0049997 A1* | 3/2011 | Urano | H02J 5/005 |
| | | | 307/104 |
| 2012/0305096 A1* | 12/2012 | Haller | H01F 7/064 |
| | | | 137/15.08 |

FOREIGN PATENT DOCUMENTS

| | | |
|---|---|---|
| DE | 10203765 A1 | 8/2003 |
| DE | 10216143 A1 | 10/2003 |
| DE | 102005003850 A1 | 8/2006 |
| WO | 2006048269 A1 | 5/2006 |

* cited by examiner

VALVE MODULE WITH WIRELESS ENERGY-TRANSFER UNIT

The invention relates to a valve module.

BACKGROUND OF THE INVENTION

It is known from the state of the art to equip valve modules with sensors which detect for example pressures, temperatures, forces, working cycles, distances, fluid properties, flow and/or strains.

Such sensors must be connected via signalling equipment to an allocated control unit, wherein the sensors of a valve module are usually connected to a control unit present in the valve module. In this connection, this is also referred to as the contacting of the sensors.

The contacting of the sensors here is comparatively easy if the sensors are arranged inside the control unit or at least close to it.

In the case of sensors which are placed at a distance from the control unit it is sought in most valve module applications not to run any cables in an external area of the valve module, as the valve module is thus difficult to clean and the cables are susceptible to mechanical loading. The risk of cables arranged in the external area being damaged during operation of the valve module is therefore comparatively high.

From a measurement point of view, the desire to always install the sensors in the area where the characteristic values are to be detected is in opposition to these requirements. A pressure sensor is thus to be installed, as far as possible, within the area where it is to record the pressure. The same applies to a temperature sensor. A position sensor in contrast is to be placed, as far as possible, on or close to the allocated moving element.

The contacting or connection of the sensors to the allocated control unit is thus in conflict in terms of objectives with the placing of the sensors in the context of a precise detection of the sensor values.

Against this background, the object of the invention is to specify an improved valve module.

SUMMARY OF THE INVENTION

The object is achieved by a valve module of the type named at the beginning which has a wireless energy-transfer unit, which comprises at least one energy-transmitting unit and at least one energy-receiving unit, wherein the energy-receiving unit is arranged on a valve piston, on a valve spindle, on a valve actuator housing, a valve housing or on a valve-closing element. The energy-receiving unit is thus arranged at or on those points or elements at or on which it makes sense in measurement terms to arrange sensors. The energy-receiving unit is preferably integrated in the above-named elements. This means that the energy-receiving unit is connected to the above-named elements at least in such a way that it ends substantially flush with their surface. Particular care is to be taken here that the elements bearing the energy-receiving unit are not disrupted in terms of their function by the energy-receiving unit. Among other things, in this connection the energy-receiving unit must not impair fluid lines or fluid chambers of the valve module. In general terms a possibility is thus provided for supplying energy to those points which are equipped with sensors in a way that makes sense in measurement terms. This is also referred to here as passive energy supply. Cables can be dispensed with here. The above-named conflict of objectives between the contacting and the arrangement of sensors is thereby resolved or at least reduced in terms of its severity.

The valve module can comprise a pneumatic valve-actuating unit. Such valve-actuating units have proved to be successful in the state of the art and function reliably and durably. In particular, pressure sensors and position sensors, which detect the position of the piston, are important because of the pneumatics which as a rule involve pneumatic cylinders and allocated pistons.

Furthermore, the valve module can be a diaphragm valve module and the valve-closing element can be a valve diaphragm. Diaphragm valve modules are known in particular from applications using hygiene-sensitive fluids and have proved to be successful in this field. In this embodiment the energy-receiving unit is arranged in the valve diaphragm and is preferably designed flexible, with the result that it can be elastically deformed together with the valve diaphragm. The valve diaphragm can thus be supplied with energy in a simple manner, with the result that it becomes possible to install sensors, for example, inside the valve diaphragm.

The energy-receiving unit is preferably connected to a sensor unit or an actuator unit in an electrically conducting manner. As already described, the sensor unit is in particular formed to detect pressure, temperature, force, working cycles of the valve module, distances, fluid properties, flows and/or strains. The sensor unit or the actuator unit is thus supplied with energy wirelessly by the energy-receiving unit. The conflict of objectives described above with respect to the sensor units is thus nullified, as the boundary conditions with respect to the contacting of the sensor unit or the connection of the sensor unit to the control unit do not apply. The sensors can thus be placed precisely at those points at which the associated sensor values can best be detected. The same applies to the actuator units.

In addition, in one embodiment, the energy-transmitting unit is arranged on or in a valve control unit or in an external area of the valve actuator housing, in particular wherein the energy-transmitting unit is connected to a valve control unit in an electrically conducting manner. The energy-transmitting unit must be connected to an energy source. If this is done via the valve control unit, the energy-transmitting unit can, at the same time, be controlled via the valve control unit. The resulting structure of the valve module is thus simple.

The energy-receiving unit can here be arranged opposite the energy-transmitting unit in an internal area of the valve actuator housing. In other words, the energy-receiving unit and the energy-transmitting unit thus lie on two opposite sides of a valve actuator housing wall. The wireless energy transmission therefore takes place through the valve actuator housing wall. The arrangement opposite each other results in a high efficiency during the energy transmission. Because valve actuator housing walls are usually only a few millimetres thick, the energy-transmission path is comparatively short. It thus becomes possible to transmit energy wirelessly also through valve actuator housings which are produced from an electrically conductive material, e.g. from a metal. Sensor units and/or actuator units inside a valve actuator housing can thus be supplied with energy in a simple manner.

In one variant, the valve module comprises a valve-actuation axis, along which the valve module is actuatable, wherein all energy-transmitting units and all energy-receiving units are arranged at least in pairs along an energy-transmission axis, which preferably runs with a parallel offset to the valve-actuation axis or is congruent with it. The valve-actuation axis here corresponds, for example, to a centre axis of a valve spindle. Because of the arrangement of the energy-transmitting units and the energy-receiving units along an energy-transmission axis, energy-transmitting units and energy-receiving units allocated to each other are opposite each other areally in such a way that they overlap as much as possible, viewed along the energy-transmission axis. An efficient and reliable energy transmission is thus guaranteed. In addition, a space-saving arrangement of the energy-receiving unit and of the energy-transmitting unit inside the valve module is achieved by the parallel or congruent arrangement thereof.

In particular, the energy-transmission axis is congruent with the valve-actuation axis, and the energy-receiving units and the energy-transmitting units have an outer diameter which corresponds substantially to 50% to 100% of an outer diameter of the valve actuator housing. The energy-receiving unit and the energy-transmitting unit are thus arranged concentric relative to the valve-actuation axis. Within the installation space predefined by the valve module an outer diameter of the energy-transmitting unit and an outer diameter of the energy-receiving unit can thus be chosen comparatively large. In the case of large outer diameters the field strength of the energy-transmitting unit and the sensitivity of the energy-receiving unit tend to increase. In the context of a reliable wireless energy supply, the diameters of the energy-receiving unit and of the energy-transmitting unit are thus to be chosen as large as possible. This is implemented here so that a reliable and efficient energy supply of the energy-receiving unit is guaranteed.

In this connection the risk increases that in the case of larger energy-transmitting units or energy-receiving units electrically conductive components lie between these or in their vicinity and have a negative effect on the wireless energy transmission. However, the effect resulting from the increasing field strength exceeds these consequences, with the result that larger energy-transmitting units and larger energy-receiving units as a whole lead to an improved energy transmission.

In an alternative embodiment the energy-transmission axis has a parallel offset to the valve-actuation axis, and the energy-receiving units and the energy-transmitting units have an outer diameter which corresponds substantially to 10% to 50% of an outer diameter of the valve actuator housing. In this connection too it is essential to choose the outer diameter of the energy-receiving unit and of the energy-transmitting unit as large as possible. A reliable wireless energy supply is thus also guaranteed in the case of an energy-transmission axis with a parallel offset.

The valve module according to the invention can comprise components made of electrically conductive material, in particular made of metal. A coil spring provided in the valve module and/or a valve spindle are preferably produced from metal. A valve housing and/or a valve actuator housing can also be produced at least in portions from metal. Electrically conductive materials are thus present in the area of the energy-transmitting unit and/or in the area of the energy-receiving unit. In particular, the electrically conductive materials lie between the energy-transmitting unit and an energy-receiving unit allocated thereto. However, the wireless energy-transmitting unit is tuned in such a way that it functions reliably even under the influence of the electrically conductive materials. The effect of electrically conductive materials, as a rule having a negative impact on wireless energy-transmitting units, can thus be overcome in an energy-transmitting unit according to the invention.

The valve module can also comprise two energy-transmitting units, wherein an allocated energy-receiving unit is arranged between the energy-transmitting units. In other words, the energy-receiving unit is supplied with energy wirelessly by energy-transmitting units from two opposite sides. The energy supply is thereby particularly efficient. In this connection the energy-transmitting units can comprise transmitter coils, through which current flows in the same direction. This is an advantageous arrangement, via which particularly large energy requirements can be met wirelessly.

In particular, the two transmitter coils are arranged as a so-called Helmholtz arrangement. The two coil diameters are identical and the distance between the two transmitter coils corresponds to the coil diameter.

In one embodiment the energy-transmitting unit comprises an energy-transmitter coil with 3 to 200 coil turns, in particular with 20 to 100 coil turns. This number of coil turns has proved to be particularly advantageous in connection with valve modules. This is the case in particular against the background that metallic components, which make a wireless energy transmission difficult due to eddy currents generated therein, are as a rule present within a valve module. Despite these negative influences, therefore, a reliable wireless energy transmission is possible.

A coil spring present in a valve-actuating unit is preferably the energy-transmitter coil or a part thereof. The coil spring thus has two functions. On the one hand it assists in the wireless energy transmission. On the other hand it furthermore undertakes the mechanical function within the valve-actuating unit and in this connection preferably puts a strain on a moving valve-actuating part. Due to this integration of functions the structure of the valve module is particularly simple and also light-weight due to the parts thus dispensed with.

The energy-receiving unit can comprise an energy-receiver coil with 100 to 3000 coil turns, in particular with 500 to 2000 coil turns. As in the case of the energy-transmitter coil, this number of coil turns has proved to be advantageous in connection with valve modules. This is the case in particular against the background that metallic components, which make a wireless energy transmission difficult due to eddy currents generated therein, are as a rule present within a valve module. Despite these negative influences, therefore, a reliable wireless energy transmission is possible.

The energy-transmitter coil and/or the energy-receiver coil are/is preferably equipped with a core, which is composed of one piece and made of ferromagnetic material. Alternatively, laminated cores which comprise core segments electrically insulated from each other can be used, whereby eddy currents in the core are avoided. The efficiency of the energy-transmitter coil and/or of the energy-receiver coil is thereby improved in the case of the wireless energy transmission.

The energy-transmitter coil and/or the energy-receiver coil can be printed, etched or wound. Mixed forms are also possible. The energy-transmitter coil and/or the energy-receiver coil can thus be produced in a simple and cost-effective manner.

In addition, the energy-transmitter coil and/or the energy-receiver coil can be mechanically protected from negative environmental influences by a cover or the like.

In an alternative design, the energy-transmitting unit and/or the energy-receiving unit in each case comprise/comprises an electromagnetic shielding unit, in particular wherein the electromagnetic shielding unit of the energy-transmitting unit is arranged on a side of the energy-transmitting unit facing away from the energy-receiving unit and/or the electromagnetic shielding unit of the energy-receiving unit is arranged on a side of the energy-receiving unit facing away from the energy-transmitting unit. The shielding units act in two directions. On the one hand electromagnetic waves coming from the valve module are thus prevented from reaching, in an uncontrolled manner, an environment where they can disrupt, for example, other electrical devices. At the same time, however, the valve module, or more precisely the wireless energy-transmitting unit, is also protected from the influence of electromagnetic waves coming from the environment, by means of the shielding unit. The valve module and in particular the wireless energy-transmitting unit thereby also function reliably in environments in which electromagnetic waves are present.

A core of the energy-transmitter coil together with a shielding unit allocated to the energy-transmitting unit is preferably designed as one module. The same applies to the energy-receiver coil, the core of which together with a shielding unit of the energy-receiving unit is preferably designed as one module. The shielding units and/or cores can thereby be produced in a particularly simple and cost-effective manner.

A transmission frequency of the wireless energy-supply unit is preferably 5 kHz to 200 kHz, in particular 10 kHz to 120 kHz, or 5 MHz to 25 MHz, in particular 10 MHz to 15 MHz. The transmission frequency is preferably chosen higher for short transmission paths than for long transmission paths. In other words: the longer the transmission path, the lower the frequency. By means of the wireless energy-transmitting unit, transmission paths in a range of from several millimetres to a few decimetres can thus be used. A reliable wireless energy supply within a valve module is thereby ensured.

In particular, the transmission frequency can be chosen to be 13.56 MHz. This transmission frequency corresponds to the HF-RFID frequency which is used in many ways in the industrial setting.

A wireless energy-transmitting unit can also function at two or more transmission frequencies. Sensor units or actuator units can thereby be supplied with energy wirelessly, and in each case are tuned to different energy-transmission frequencies. It thus becomes possible to wirelessly supply energy selectively to individual sensor units or actuator units.

The energy-transmitting unit can also function at different transmission frequencies in order to supply energy to energy-receiving units at different distances from the energy-transmitting unit. If energy-receiving units which lie relatively close to the energy-transmitting unit are to be supplied with energy, the transmission frequency tends to be chosen high. For energy-receiving units at a greater distance the transmission frequency is chosen low. A secure and reliable energy supply to energy-receiving units at different distances from the energy-transmitting unit can thus be guaranteed.

The energy-transmitting unit and the energy-receiving unit are advantageously inductively coupled, in particular resonantly inductively coupled. A reliable wireless energy supply can be realized via an inductive coupling. In the case of the resonantly inductive coupling, one capacitor each is provided in the electric circuit of the energy-transmitting unit, more precisely the energy-transmitter coil, and in the electric circuit of the energy-receiving unit, more precisely the energy-receiver coil. The capacitor can be connected in parallel or in series to the associated coil. Advantageously, the capacitor on the energy-transmitter coil is connected thereto in series and the capacitor on the energy-receiver coil is connected thereto in parallel. In this connection, this is also referred to as a series-parallel circuit. Of course, parallel-parallel circuits, parallel-series circuits or series-series circuits are also possible. As a whole, an improved wireless energy transmission results from the resonantly inductive coupling.

The energy-transmitting unit and the energy-receiving unit can also be coupled via an intermediate oscillating circuit. Such an intermediate oscillating circuit is alternatively called a resonant circuit. An electric oscillating circuit which is coupled only wirelessly to the energy-transmitting unit and the energy-receiving unit is thus arranged between the energy-transmitting unit and the energy-receiving unit. The intermediate oscillating circuit here comprises a coil and a capacitor connected to the coil in parallel. The resonant frequency of the intermediate oscillating circuit is preferably tuned to the transmission frequency of the transmitter coil. The wireless energy transmission can be improved via such an intermediate oscillating circuit.

This is the case in particular with long energy-transmission paths.

A coil spring present in a valve-actuating unit can be a coil of the intermediate oscillating circuit or a part thereof. Thus, in addition to its mechanical function, the coil spring also acts as part of the wireless energy-transmitting unit. The associated valve module with intermediate oscillating circuit can thus be constructed from comparatively few components.

A further embodiment provides that the energy-receiving unit is connected to a data-transmitting unit in order to supply it with energy. The data-transmitting unit is thus supplied with energy by the energy-receiving unit so that the data-transmitting unit can carry out its transmitting function. In particular in combination with a sensor unit supplied with energy by the energy-receiving unit, sensor values can thus be detected within a module and relayed wirelessly, for example to a control unit. The data transmission can be effected, for example, with the aid of the Bluetooth standard or the RFID standard.

BRIEF DESCRIPTION OF THE DRAWINGS

The invention is explained below with reference to various embodiment examples which are shown in the attached drawings. There are shown in.

DETAILED DESCRIPTION OF THE INVENTION

Figure 1:
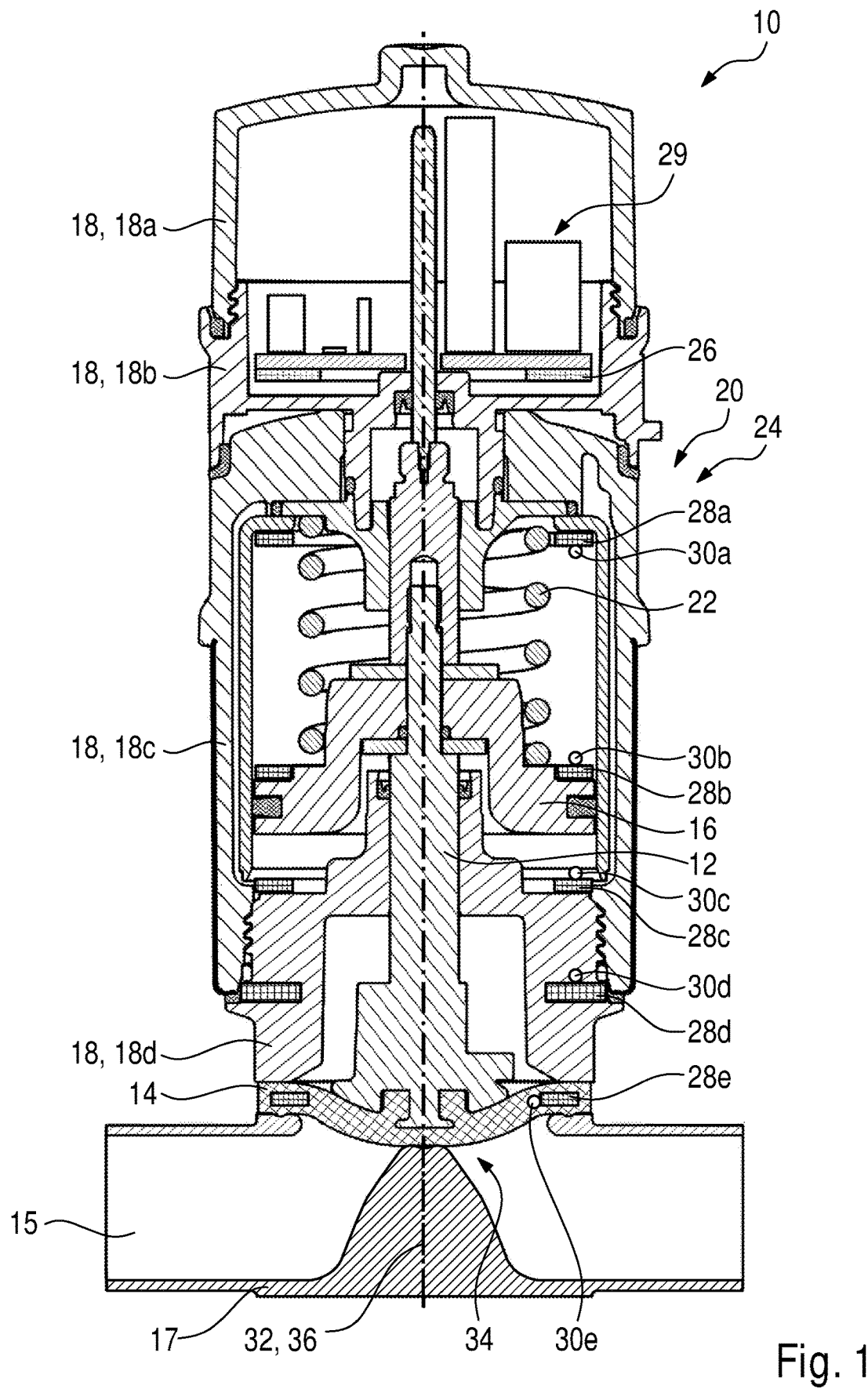
FIG. 1 a valve module according to the invention according to a first embodiment, FIG. 2 a valve module according to the invention according to a second embodiment, FIG. 3 a valve module according to the invention according to a third embodiment, FIG. 4 a valve module according to the invention according to a fourth embodiment and FIG. 5 a wireless energy-transmitting unit of the valve modules according to the invention from the preceding figures in a schematic diagram.

FIG. 1 shows a valve module 10 with a valve spindle 12, which is connected to a valve-closing element 14. The valve spindle 12 is actuated via a valve piston 16, which can close or open a fluid channel 15 in a valve housing 17.

The elements of the valve module 10 are arranged in a valve actuator housing 18, which is composed of several pieces in the embodiment represented and comprises the valve actuator housing parts 18*a* to 18*d*.

In addition, the valve module 10 represented is a diaphragm valve module. The valve-closing element 14 is therefore a valve diaphragm.

The valve module 10 also comprises a pneumatic valve-actuating unit 20. The valve piston 16 is thus a pneumatic valve piston 16.

The latter is spring-loaded by means of a coil spring 22.

The valve module 10 furthermore comprises a wireless energy-transmitting unit 24, which comprises a single energy-transmitting unit 26 and five energy-receiving units 28a, 28b, 28c, 28d and 28e in the embodiment according to FIG. 1.

The energy-transmitting unit 26 here is arranged in a valve control unit 29 and is connected thereto in an electrically conducting manner.

The energy-receiving unit 28b is provided on the valve piston 16.

The energy-receiving unit 28e is integrated in the valve-closing element 14 in the present case. In the embodiment represented the energy-receiving unit 28e is thus integrated in the valve diaphragm.

The energy-receiving units 28a, 28c and 28d are installed on the valve actuator housing 18 in the broadest sense.

The number of energy-receiving units 28a to 28e is not to be understood as limiting. Rather, the energy-receiving units 28a to 28e illustrate a range of possible points of arrangement. Depending on the embodiment, only one or several of the energy-receiving units 28a to 28e represented can also be used.

The energy-receiving units 28a to 28e are in each case connected to a sensor unit 30a to 30e in an electrically conducting manner, wherein the sensor units 30a to 30e are represented merely schematically.

In an embodiment that is not represented, the energy-receiving units 28a to 28e can additionally or alternatively be connected to an actuator unit in an electrically conducting manner.

In the embodiment according to FIG. 1 the valve module 10 is actuatable along a valve-actuation axis 32. The valve spindle 12 is displaceably mounted along this valve-actuation axis 32, with the result that a flow path 34 can be opened or closed via the valve-closing element 14.

In addition, the energy-transmitting unit 26 and all energy-receiving units 28a to 28e are arranged along an energy-transfer axis 36, which runs congruent with the valve-actuation axis 32 in the embodiment according to FIG. 1.

Moreover, an outer diameter of the energy-receiving units 28a to 28e and of the energy-transmitting unit 26 is substantially 50% to 100% of an outer diameter of the valve actuator housing 18. In the present case the outer diameters of the energy-receiving units 28a to 28e correspond to approximately 80% to 90% of the outer diameter of the valve actuator housing 18.

The energy-transmitting unit 26 has an outer diameter which is substantially 75% of the outer diameter of the valve actuator housing 18.

Figure 5:
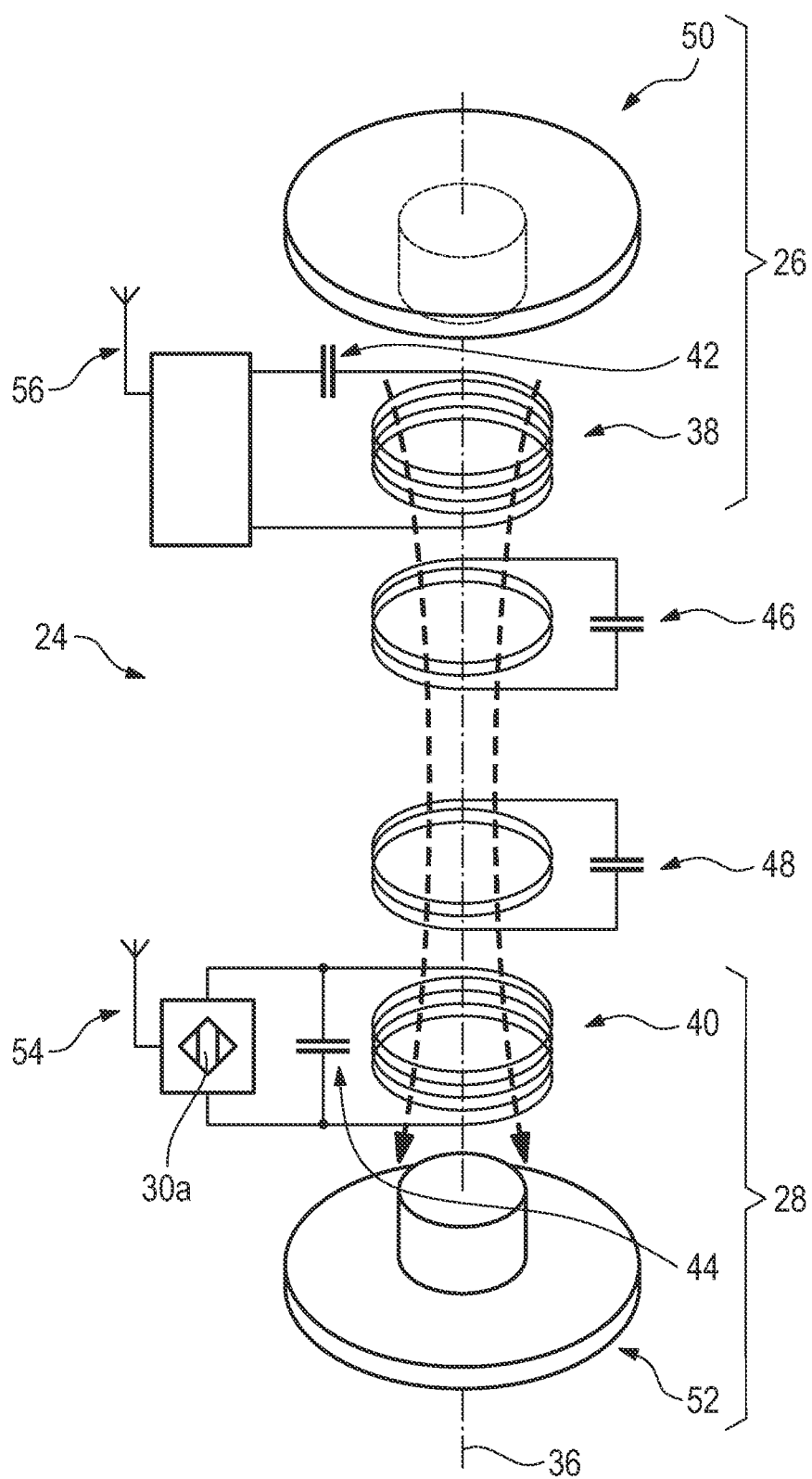

The wireless energy-transmitting unit 24 is to be seen in detail in FIG. 5. By way of example, only a single energy-receiving unit 28 is represented here, which is connected to a single sensor unit 30a in an electrically conducting manner.

The energy-transmitting unit 26 here comprises an energy-transmitter coil 38 and the energy-receiving unit 28 comprises an energy-receiver coil 40.

The energy-transmitter coil 38 has 3 to 200 coil turns.

The energy-receiver coil 40 has 100 to 3000 coil turns.

In addition, a capacitor 42 is connected to the energy-transmitter coil 38 in series, and a capacitor 44 is connected to the energy-receiver coil 40, wherein it is connected to the energy-receiver coil 40 in parallel.

The energy-transmitting unit 26 and the energy-receiving unit 28 are thus coupled to each other in a resonantly inductive manner.

The coupling is not direct, but via a first intermediate oscillating circuit 46 and/or a second intermediate oscillating circuit 48.

Both intermediate oscillating circuits 46, 48 in each case comprise a coil, not defined more precisely, and a capacitor, not defined more precisely. The intermediate oscillating circuits are tuned, with respect to their resonant frequency, to a transmission frequency of the wireless energy-transmitting unit 24 and thus serve for improved energy transmission.

The energy-transmitting unit 26 moreover comprises a combined shielding and core unit 50. This thus comprises a core for the energy-transmitter coil 38 and shields the energy-transmitter coil 38 from an environment, at least on one side.

The energy-receiving unit 28 also comprises a combined shielding and core unit 52, wherein this comprises a core for the energy-receiver coil 40 and shields the latter from an environment.

Furthermore, the energy-receiving unit 28 is connected to a data-transmitting unit 54 in order to supply it with energy.

By means of the data-transmitting unit 54, the energy-receiving unit 28 can then wirelessly communicate, for example, a sensor value detected by the sensor unit 30a.

The energy-transmitting unit 26 is coupled in this connection to a data-receiving unit 56, which can receive such a sensor value.

In an alternative not represented in more detail, the energy-receiving unit 28 is coupled to two energy-transmitting units 26, wherein the energy-receiving unit 28 is arranged between the energy-transmitting units 26.

Figure 2:
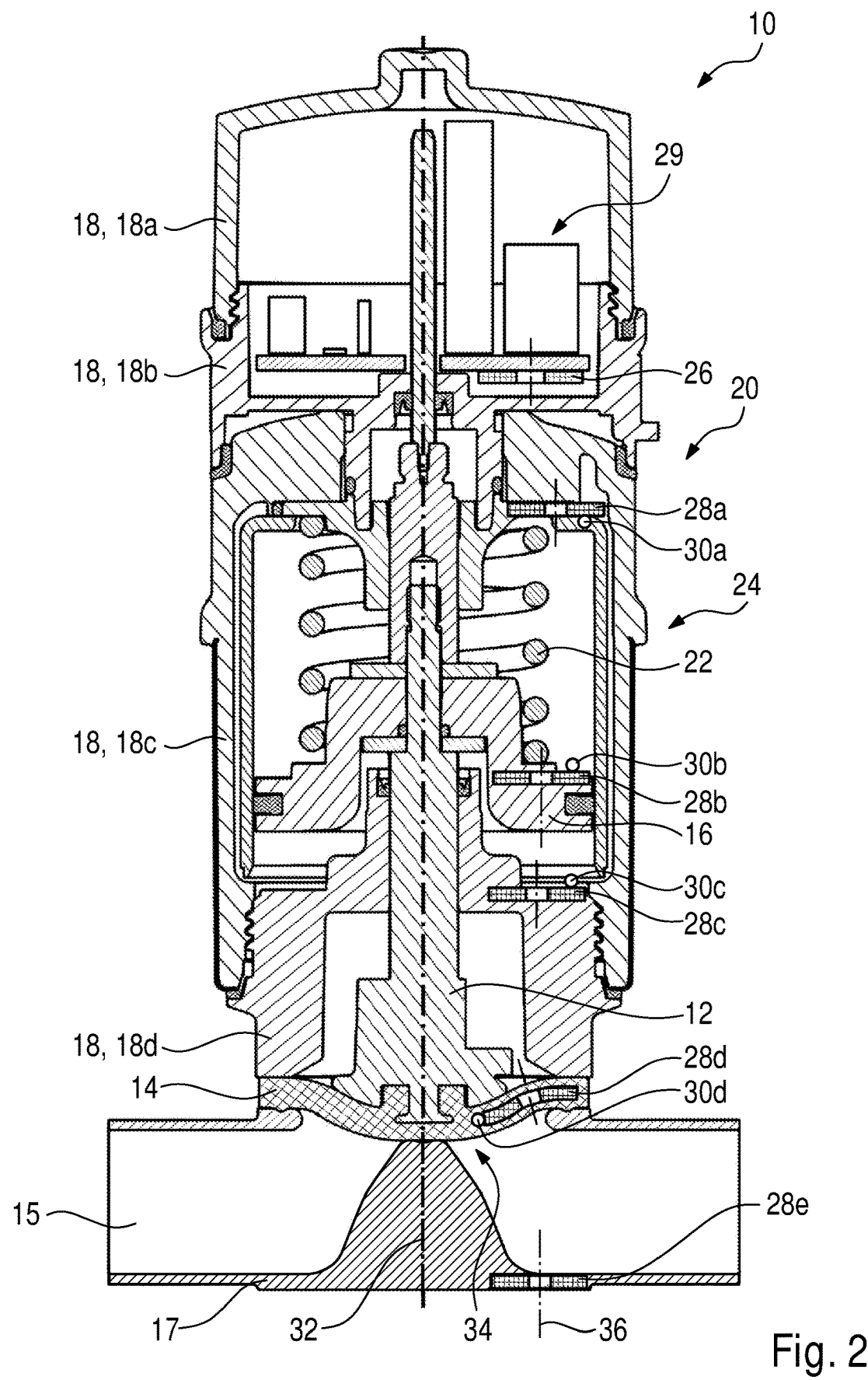

FIG. 2 shows an alternative embodiment of the valve module 10. Only the differences from the embodiment according to FIG. 1 are discussed here.

The energy-transfer axis 36 now has a parallel offset to the valve-actuation axis 32.

It is not essential that in FIG. 2 the centre axes of the individual energy-receiving units 28a to 28e and of the energy-transmitting unit 26 are arranged with a slight offset to each other. It is equally unimportant that the centre axis of the energy-receiving unit 28d is additionally inclined relative to the rest of the centre axes in the pictured position of the valve-closing element 14 or of valve membrane. In this connection it is important only that the energy-receiving units 28a to 28e and the energy-transmitting unit 26 substantially overlap viewed along the energy-transfer axis 36.

The energy-receiving unit 28e sits outside the valve actuator housing 18 in the valve housing 17, but in the energy-transfer axis 36, like the energy-receiving units 28a to 28d.

The energy-receiving units 28a to 28e are also in some cases positioned at other points inside the valve module 10. As in the embodiment according to FIG. 1, however, these are only suggestions for the positioning of the energy-receiving units 28a to 28e.

The energy-receiving units 28a to 28e as well as the energy-transmitting unit 26 now in each case have an outer diameter which corresponds to substantially 10% to 50% of the outer diameter of the valve actuator housing 18. In the example represented the outer diameters of the energy-receiving units 28a to 28e and of the energy-transmitting unit 26 lie substantially in the range of from 20% to 30% of the outer diameter of the valve actuator housing 18.

Figure 3:
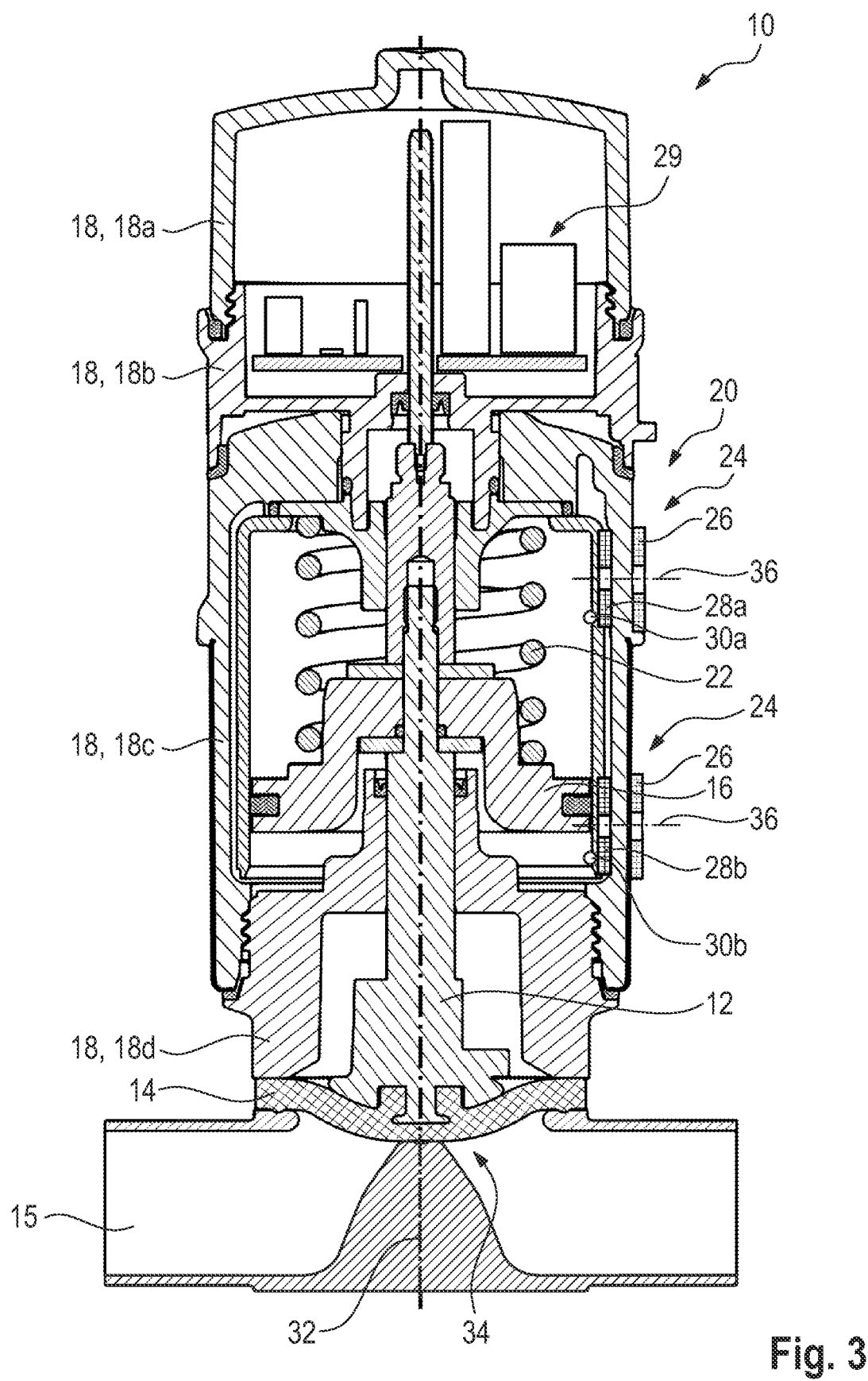

FIG. 3 shows an additional embodiment of the valve module 10, wherein again only the differences from the above-named embodiments are discussed.

The embodiment according to FIG. 3 comprises two energy-transmitting units 26, which are arranged in an outer area of the valve actuator housing 18. The energy-transmitting units can be connected to the valve control unit 29 in an electrically conducting manner (not represented).

Each of the two energy-transmitting units 26 is allocated an energy-receiving unit 28a, 28b, which is in each case arranged opposite in an inner area of the valve actuator housing 18.

The wireless energy transmission thus takes place through a wall of the valve actuator housing 18.

The embodiment according to FIG. 3 thus has two wireless energy-transfer units 24.

In contrast to the above-named embodiments, the energy-transfer axes 36 now also run transverse to the valve-actuation axis 32.

The embodiment according to FIG. 4, which is again explained only with respect to its differences from the above-named embodiments, corresponds to the embodiment according to FIG. 2 with respect to the energy-receiving units 28d and 28e.

Figure 4:
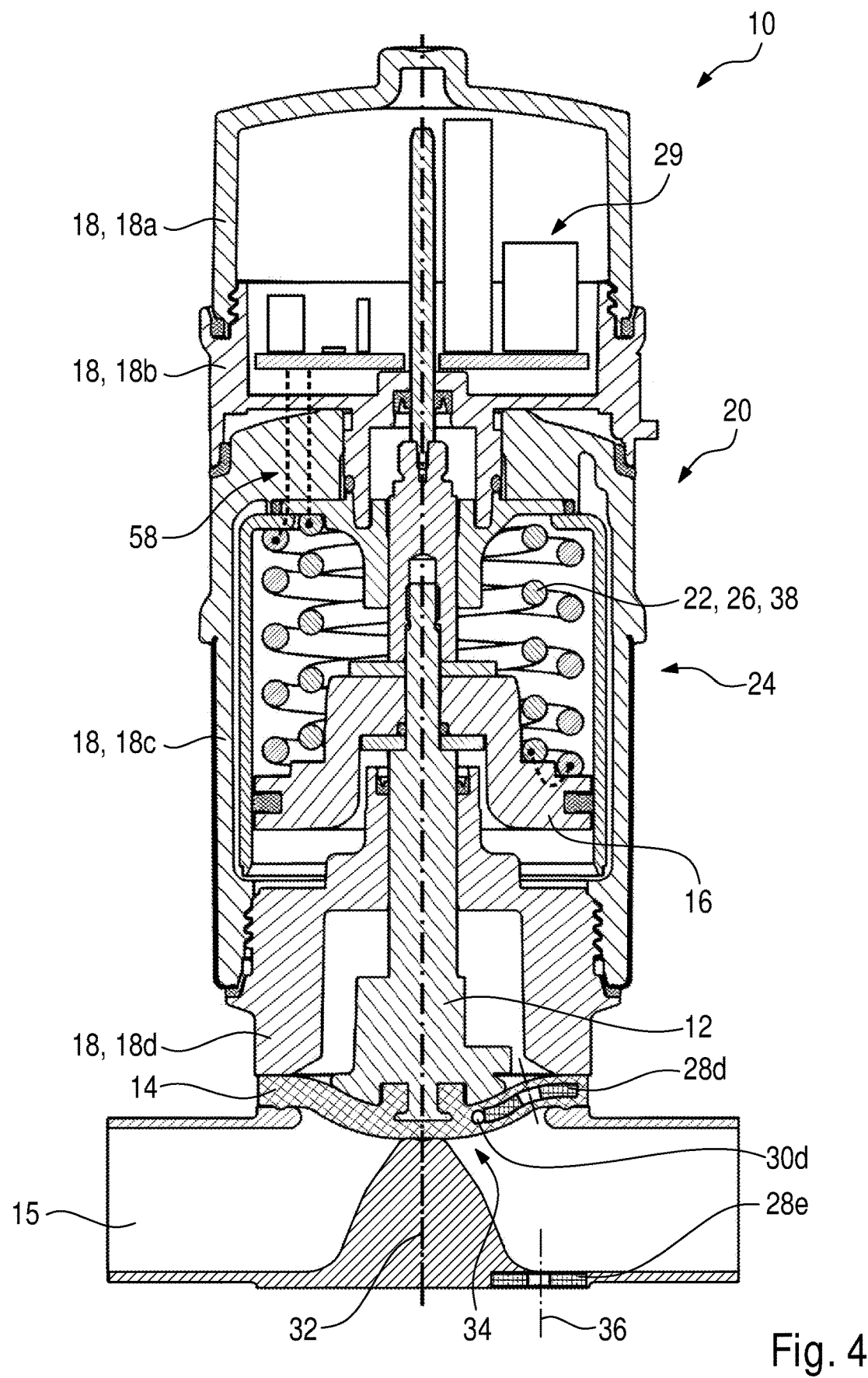

Further energy-receiving units 28 are not represented in the embodiment according to FIG. 4, but of course can be present.

In addition, the energy-transmitting unit 26 is constructed differently. Namely, the coil spring 22 is now the energy-transmitter coil 38 of the energy-transmitting unit 26.

The coil spring 22 is connected to the valve control unit 29 of the valve module 10 via an electrical connection 58.

Accompanying this, the energy-transmitting unit 26 and the energy-receiving units 28d, 28e are now no longer arranged on a common energy-transfer axis 36. However, the energy-receiving units 28d, 28e are overlapped by the energy-transmitting unit 26 if the valve module 10 is viewed along the valve-actuation axis 32.

The functionality of the wireless energy-transfer unit 24 also results for the embodiment according to FIG. 4 corresponding to FIG. 5.

The invention claimed is:

1. A valve module with a wireless energy-transfer unit, which comprises at least one energy-transmitting unit and at least two energy-receiving units, and with at least two sensor units,
    wherein the at least two energy-receiving units are arranged on a valve actuator housing,
    wherein the at least two energy-receiving units are each connected to a-one of the at least two sensor units, respectively, the at least two sensor units being located inside the valve actuator housing,
    wherein the at least two sensor units are supplied with energy on different energy-transmission frequencies.

2. The valve module according to claim 1, wherein the valve module comprises a pneumatic valve-actuating unit.

3. The valve module according to claim 1, wherein the energy-transmitting unit is arranged on or in a valve control unit or in an external area of the valve actuator housing.

4. The valve module according to claim 3, wherein the energy-transmitting unit is connected to the valve control unit in an electrically conducting manner.

5. The valve module according to claim 3, wherein the at least two energy-receiving units are arranged opposite the energy-transmitting unit in an internal area of the valve actuator housing.

6. The valve module according to claim 1, characterized by a valve-actuation axis, along which the valve module is actuatable, wherein all energy-transmitting units and all energy-receiving units are arranged at least in pairs along an energy-transfer axis.

7. The valve module according to claim 6, wherein the energy-transfer axis is congruent with the valve-actuation axis and the energy-receiving units and the energy-transmitting units have an outer diameter which corresponds to 50% to 100% of an outer diameter of the valve actuator housing.

8. The valve module according to claim 6, wherein the energy-transfer axis has a parallel offset to the valve-actuation axis and the energy-receiving units and the energy-transmitting units have an outer diameter which corresponds to 10% to 50% of an outer diameter of the valve actuator housing.

9. The valve module according to claim 1, characterized by two energy-transmitting units, wherein one of the at least two energy-receiving units is arranged between the two energy-transmitting units.

10. The valve module according to claim 1, wherein the energy-transmitting unit comprises an energy-transmitter coil with 3 to 200 coil turns.

11. The valve module according to claim 10, wherein a coil spring present in a valve-actuating unit is the energy-transmitter coil or is a part thereof.

12. The valve module according to claim 1, wherein the energy-transmitting unit and the at least two energy-receiving units are inductively coupled.

13. The valve module according to claim 1, wherein the energy-transmitting unit and the at least two energy-receiving units are resonantly inductively coupled.

14. The valve module according to claim 1, wherein the energy-transmitting unit and the at least two energy-receiving units are coupled via an intermediate oscillating circuit.

15. The valve module according to claim 14, wherein a coil spring present in a valve-actuating unit is a coil of the intermediate oscillating circuit or a part thereof.

16. The valve module according to claim 1, wherein at least one of the at least two energy-receiving units is connected to a data-transmitting unit in order to supply the data-transmitting unit with energy.

17. The valve module according to claim 1, wherein the valve module is a diaphragm valve module including a valve-closing element, wherein the valve-closing element is a valve diaphragm.

18. A valve module with a wireless energy-transfer unit, which comprises at least one energy-transmitting unit and at least one energy-receiving unit,
    wherein the energy-receiving unit is arranged on a valve actuator housing,
    wherein the energy-receiving unit is connected to a sensor unit being located inside the valve actuator housing, wherein the sensor unit is supplied with energy by the energy-receiving unit, the sensor unit being formed to detect at least one of a pressure, a temperature, a force, a working cycle of the valve module, a distance, a fluid property, a flow, and a strain,
    wherein the sensor unit and the energy-receiving unit are entirely located inside the valve actuator housing, and
    wherein the valve module comprises a pneumatic valve-actuating unit.

19. A valve module with a wireless energy-transfer unit, which comprises at least one energy-transmitting unit and at least two energy-receiving units, and with at least two sensor units,
- wherein the at least two energy-receiving units are arranged on a valve actuator housing,
- wherein the at least two energy-receiving units are each connected to one of the at least two sensor units, respectively, the at least two sensor units being located inside the valve actuator housing,
- wherein the at least two sensor units are supplied with energy on different energy-transmission frequencies, and
- wherein a valve-actuating unit and a valve control unit are arranged inside the valve actuator housing and the valve actuator housing is fixedly connected to a valve housing.

* * * * *